(No Model.) 6 Sheets—Sheet 1.

C. V. ROTE.
AUTOMATIC CAR BRAKE.

No. 274,389. Patented Mar. 20, 1883.

WITNESSES

INVENTOR
Chas. V. Rote
by A. M. Smith
Attorney (No Model.)  6 Sheets—Sheet 2.
C. V. ROTE.
AUTOMATIC CAR BRAKE.
No. 274,389. Patented Mar. 20, 1883.
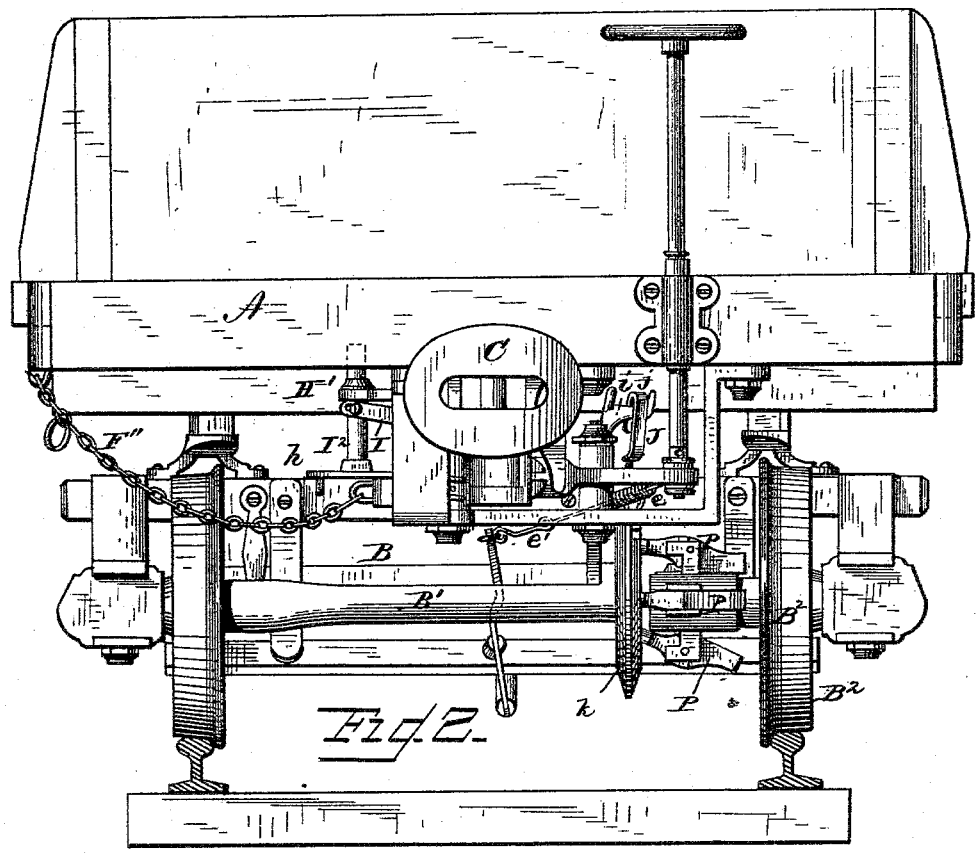
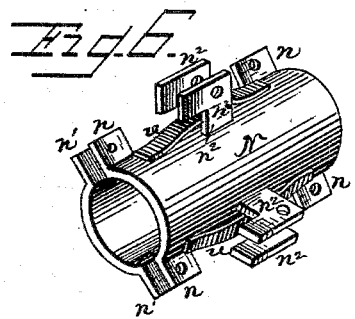
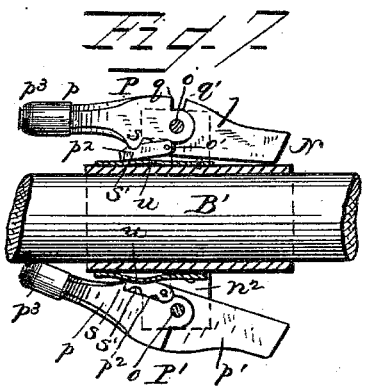
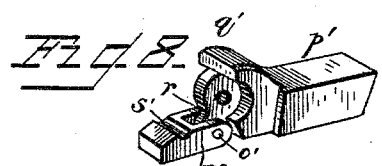
WITNESSES  
INVENTOR  
Chas. V. Rote  
by A. Ell Smith  
Attorney

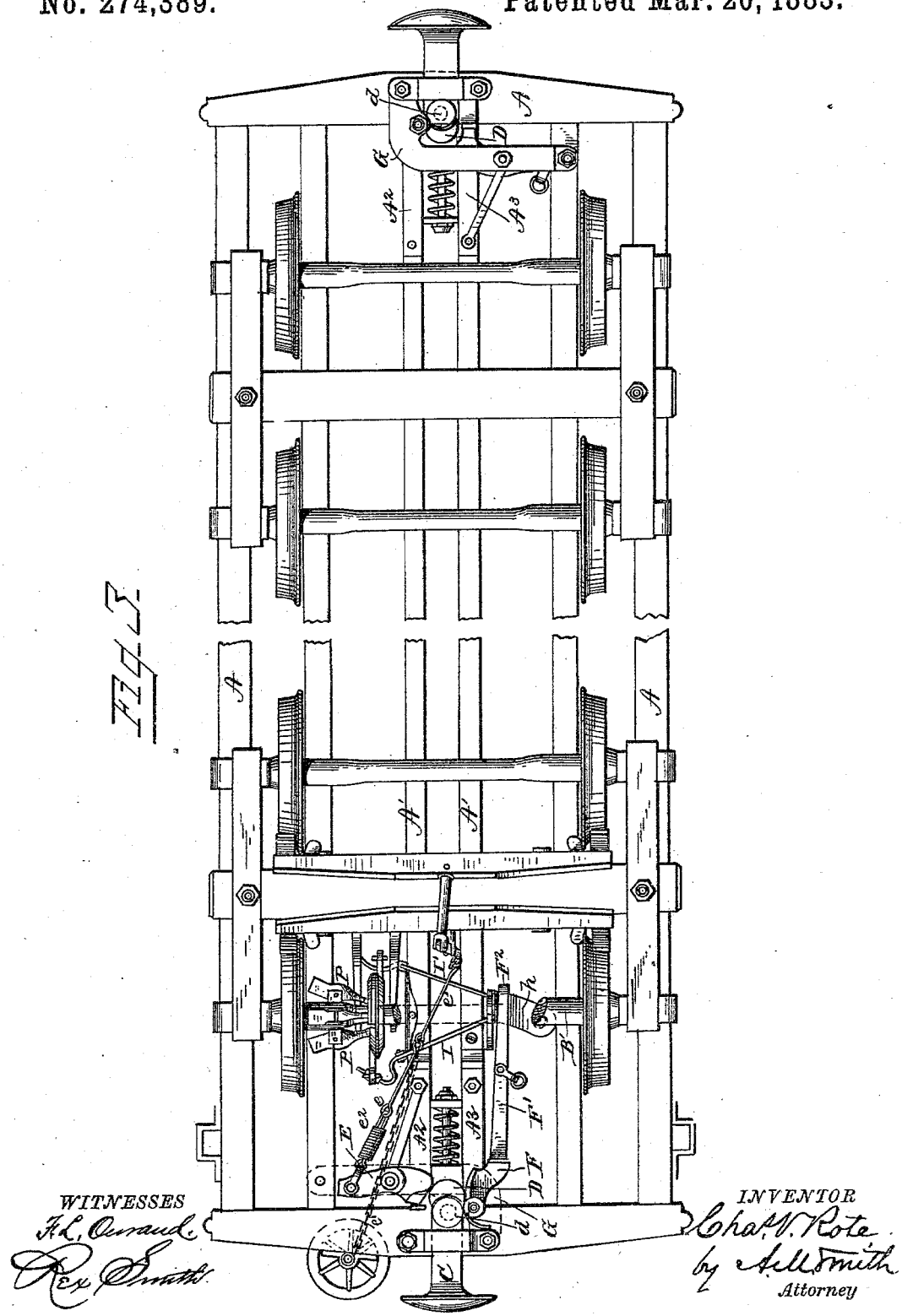

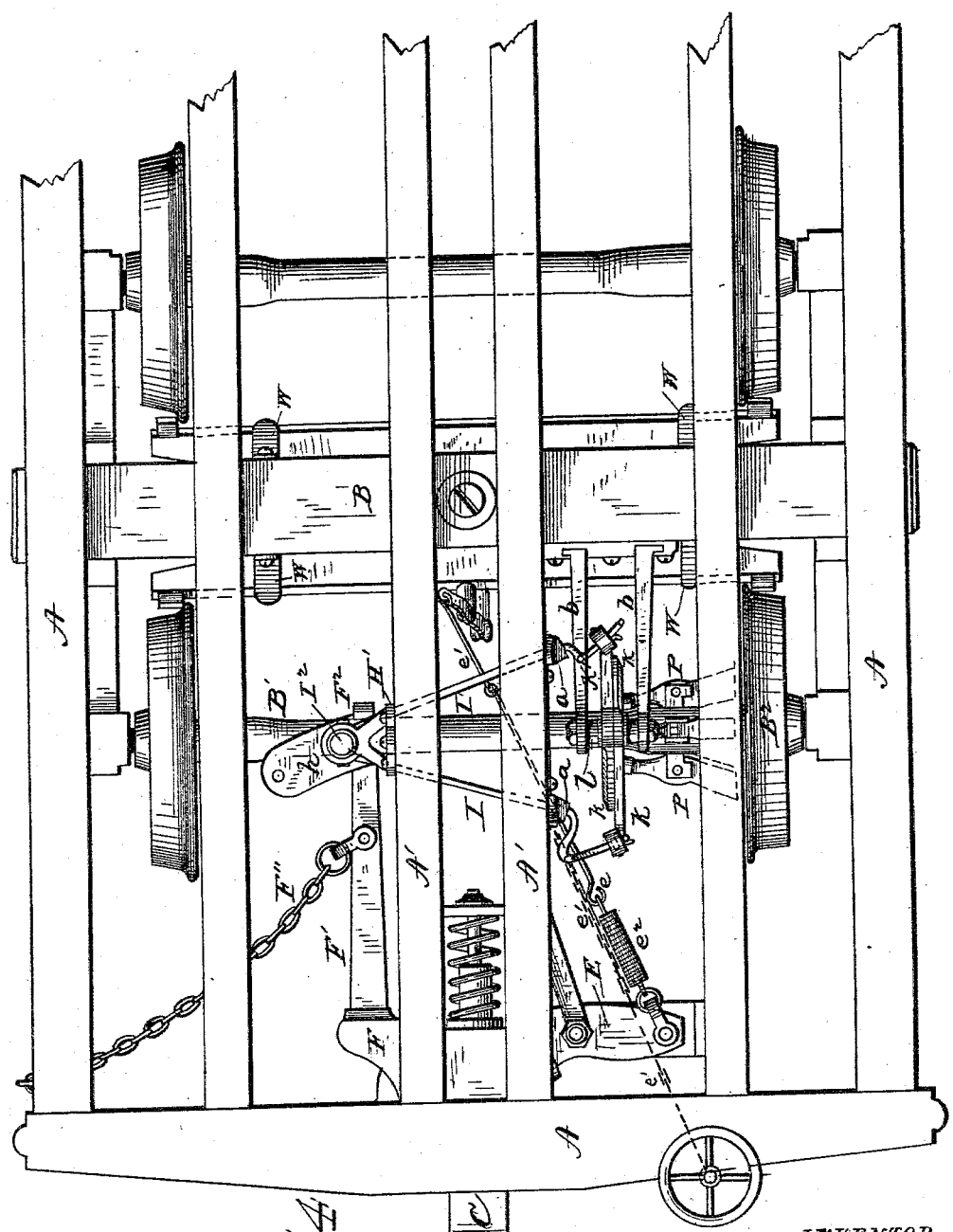

(No Model.) 6 Sheets—Sheet 5.

C. V. ROTE.
AUTOMATIC CAR BRAKE.

No. 274,389. Patented Mar. 20, 1883.

WITNESSES
F. L. Ourand
Rex Smith

INVENTOR
Chas V. Rote
by A. M. Smith
Attorney (No Model.) 6 Sheets—Sheet 6.
C. V. ROTE.
AUTOMATIC CAR BRAKE.

No. 274,389. Patented Mar. 20, 1883.

WITNESSES
F. L. Ourand
Rox Smith

INVENTOR
Chas. V. Rote
by A. M. Smith
Attorney

UNITED STATES PATENT OFFICE.

CHARLES V. ROTE, OF LANCASTER, PENNSYLVANIA, ASSIGNOR OF SEVEN-EIGHTHS TO JOHN W. HOLMAN AND ROBERT M. AGNEW, OF SAME PLACE, HENRY HICE, OF BEAVER, PENNSYLVANIA, AND MICHAEL D. HARTER, OF MANSFIELD, OHIO.

AUTOMATIC CAR-BRAKE.

SPECIFICATION forming part of Letters Patent No. 274,389, dated March 20, 1883.

Application filed January 9, 1883. (No model.)

*To all whom it may concern:*

Be it known that I, CHARLES V. ROTE, of Lancaster, county of Lancaster, and State of Pennsylvania, have invented a new and useful Improvement in Automatic Car-Brakes, of which the following is a full, clear, and exact description, reference being had to the accompanying drawings, making part of this specification.

The object of my invention is to produce a car-brake operated by the compression or inward thrust of the draw-head, and intended to be automatic in its action in whatever direction the car may be drawn, and which, when a pushing-engine is employed, will be automatically relieved in such manner as to prevent any interference with the action of such pushing-engine.

It consists in the employment, in combination with a sliding or movable draw-bar provided with an adjustable block or dog for actuating the brake-lever, of a cam-lever for adjusting said block or dog, a gravity-stop for locking said cam-lever, and means for automatically releasing said cam-lever; the employment of compound or jointed and rotating levers for automatically releasing the cam-lever, controlled by the speed of movement of the car, and in certain details of construction and arrangement of the parts employed in carrying out said invention, hereinafter fully explained.

Figure 1:
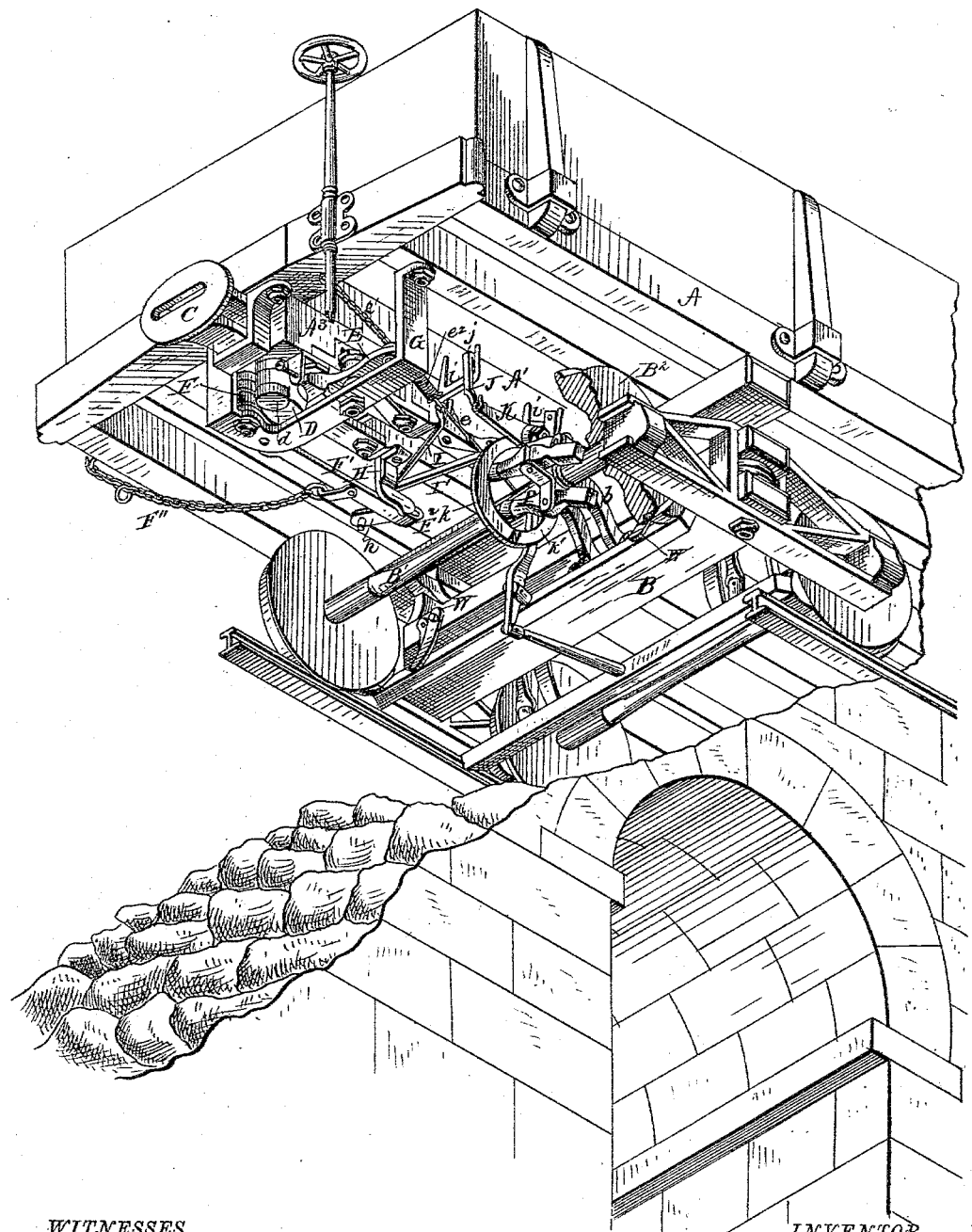
Figure 5:
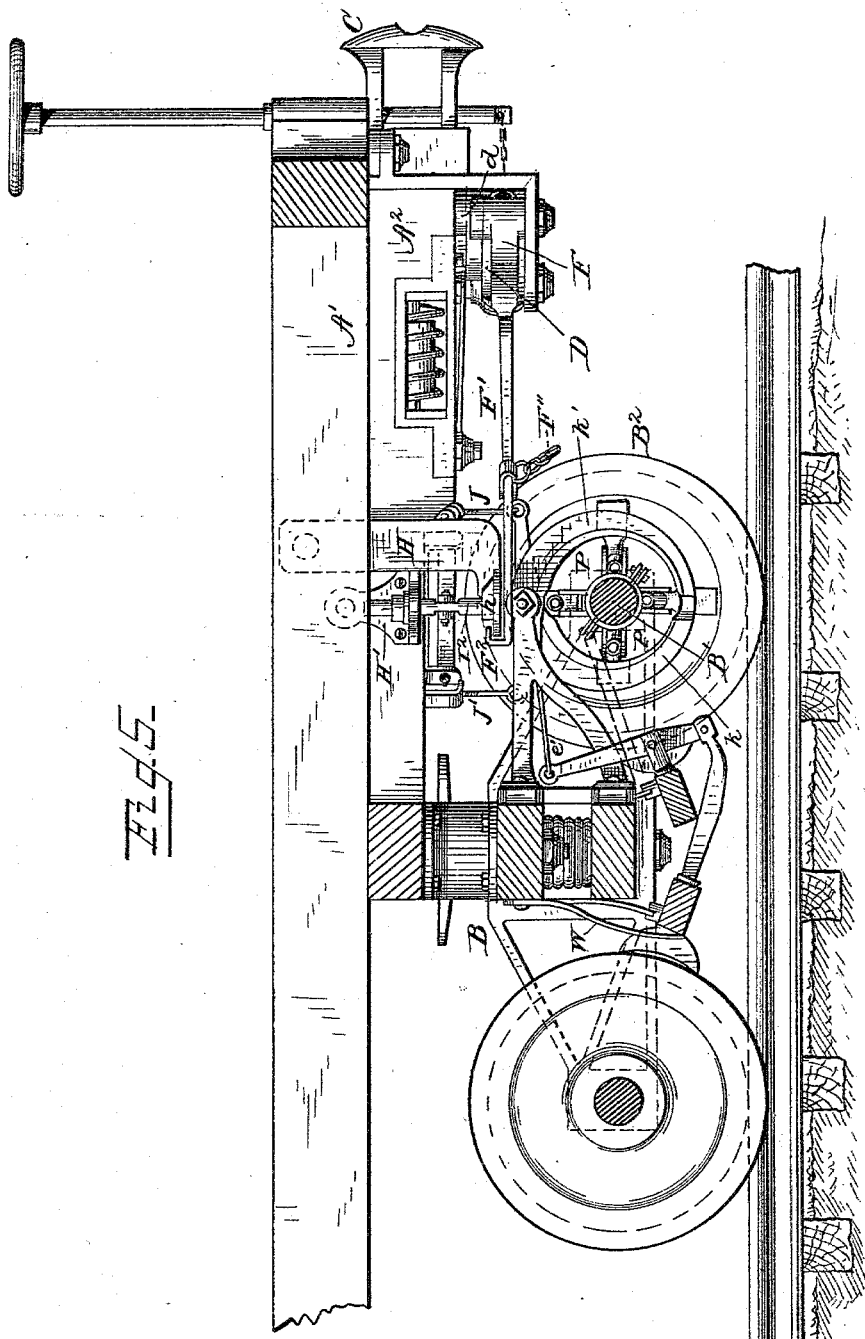
Figure 10:
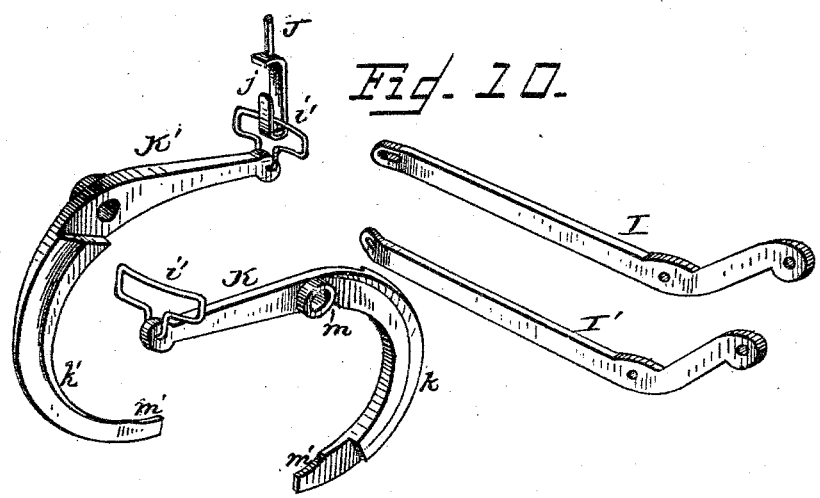
Figure 11:
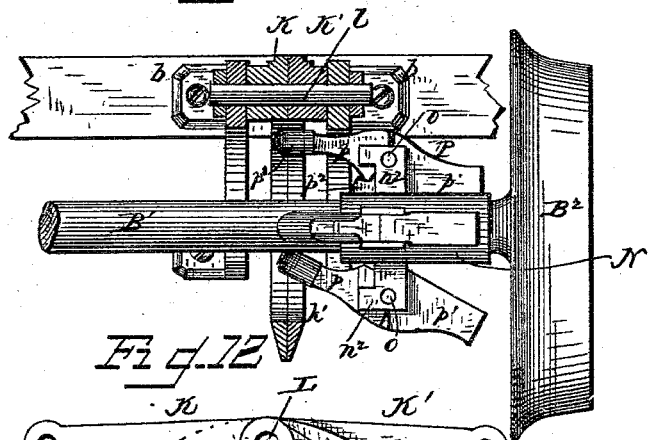
Figure 12:
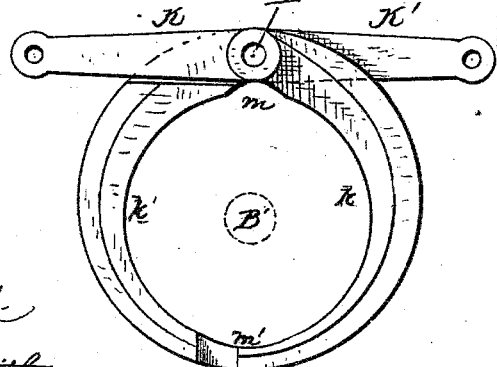

In the accompanying drawings, Figure 1 is a perspective view, looking from underneath, of a portion of a car frame and truck, showing my improvements applied. Fig. 2 is an end elevation of a car, showing my improvements applied. Fig. 3 is a bottom view of a car, showing my improvements applied to one end, the "hanger," hereinafter described, being removed, or shown only in dotted lines, and shown applied to the other end of the car. Fig. 4 is a plan view, enlarged, of one end of the car, with the flooring removed to show the brake mechanism. Fig. 5 represents a vertical longitudinal section through an end-of the car (platform) frame and its supporting-truck. Fig. 6 is a perspective view of one of the sectional or divided sleeves through which the jointed levers are connected with the car-axle. Fig. 7 is a longitudinal section through one of said sleeves applied to the shaft, showing two of the latches in side elevation; and Figs. 8 and 9 are perspective views, showing one of the compound or jointed levers in detail. Fig. 10 shows in detail a modification in the form of the levers through which the jointed levers act upon the cam-lever stop. Fig. 11 is a front elevation of one end of the car-axle with the jointed levers applied, and with the curved levers operated upon thereby in section; and Fig. 12 is a side elevation of the semi-annularly armed levers.

As the invention relates to the means for setting and relieving the brake-actuating mechanism and not to the construction of the brakes themselves, nor to the form or construction of the car and trucks to which such brakes may be applied, the latter features will not be described further than is necessary to show the manner of connecting the brake mechanism therewith.

A A' represent the platform-frame of a car, B one of the car-trucks, and C the sliding draw-bar, which parts, together with the brakes and the levers, rods, and chains for connecting the brakes with each other, and with the usual hand-wheels for actuating said brakes, may be similar in construction and arrangement to such as are now in use. The sliding draw-bar is usually arranged to slide between two hounds, $A^2$ $A^3$, attached to the lower faces of the central longitudinal joists or stringers, A' A'—an arrangement which leaves the lower face of said draw-bar uncovered; and to this face, therefore, by preference, I attach an adjustable block or dog, D, which is shown attached by its outer end to said draw-bar by a vertical pivotal pin or bolt, $d$, or clamp, upon which the rear or inner end of the block or dog can be vibrated. At one side of this block or dog is a brake-lever, E, arranged at right angles, or thereabout, to the path of the dog D, and with its inner short end, adjacent thereto, projected within said path when the dog is held or located in operative position, and having its outer end connected by a link, $e$, with the rod or chain e', through which the brakes as ordinarily arranged are operated by hand. By preference this link e is provided at any convenient point in its length with a spring, e², which will permit a slight yielding between the brakes and the brake-lever E, but which may be made to hold the brakes to their work with any required tension when the brake-lever is operated. The brake-lever E may be pivoted to any suitable support on the bottom of the car-body; but I prefer, in order to provide a suitable support for said lever and the cam-lever F, hereinafter described, to employ an angular hanger, G, of form substantially such as is shown in the drawings, attached by suitable feet to the bottom frame-timbers, and underlying the levers E and F, which have their pivoted supports therein. The lever F, arranged on the opposite side of the dog D from the brake-lever E, is made in angular or bell-crank form, and is pivoted at its elbow in the hanger G, in close proximity with the path of the block or dog D. The short arm of this lever is made cam-shaped on its inner end or face adjacent to block D, and serves, when the long arm is moved inward, to crowd the inner end of the dog D over into position to act on the inner end of the brake-lever E. The face of the end of the brake-lever E is also by preference made cam-shaped, converging inward toward the dog in such manner that when the cam-lever is not held or locked in the position last above described for forcing the dog to act on the brake-lever, said end of the brake-lever, as the dog is moved inward, will crowd it to one side, and the dog, being free to swing on its pivot, will move inward without actuating the brake-lever, and by the same movement will act upon the cam-face of the cam-lever, swinging its long arm outward, for a purpose hereinafter explained. For giving the cam-lever a normal position, (indicated in Fig. 4,) in which, if locked or held, it would cause the dog to carry the inner end of the brake-lever in with it, a light spring is applied to it, at its pivot or other suitable point, of just sufficient tension to hold it in the position referred to when not acted upon by the dog, as explained, but not sufficient to interfere with the free movement of the latter. The long arm of the lever F' is shown as having a chain, F'', attached to it, the other end of said chain being adjustable upon a hook at one side of the car, for enabling the attendant to hold the cam-lever free from the dog when desired. Any other suitable device may be employed in lieu of the chain. The extreme end of the long arm of the cam-lever F is curved upward and backward into hook form, as shown at F², Fig. 5, and engages with the forward curved face or edge of a horizontal quadrant-plate, h, formed on the lower end of a pendent bracket, H, attached to one of the frame-timbers A', said quadrant serving to guide and steady the movements of the cam-lever.

In suitable brackets or pendent arms of a single bracket, a, attached to one of the frame-timbers A', or other suitable support, are pivoted two transverse levers, I and I', the long arms of which converge toward their ends, which are both united to an upright sliding pin, I², sliding in suitable eyes or guideways in the quadrant h, and an arm of bracket H, or an independent bracket, H', attached to one of the frame-timbers directly over the quadrant. The pin I², at its lower end, is adapted to pass down through the quadrant h, and, being connected with the longer and heavier arms of the levers I and I', serves, by its own gravity, to drop its lower end below the quadrant and within the path of the long arm of the cam-lever, and to hold said lever on whichever side it may be when the pin is dropped, said pin forming a gravity-stop for locking the cam-lever F in either position. The inner short arms of the levers I I' are curved upward, and are provided each with a stirrup, i, adapted to permit a laterally-sliding movement of a loop or eye, j, adjustable on the upper end of a pendent link, J or J', the lower ends of which are connected with the horizontal arms of two angular levers, K and K', the stirrup referred to permitting the necessary play of the links J and J' to accommodate the vibration of the truck relative to the car-body in turning curves, thereby obviating the twisting or wrenching of the levers K and K' from their proper working relation to the jointed latch-levers hereinafter described. In Fig. 10 the stirrups are shown in the form of loops i', applied to the horizontal arms of the curved or angular levers K and K', and for the same purpose as the stirrups i. Where this construction is employed the sliding loops or eyes j will be at the lower ends of the links J and J', instead of at the upper end, as above described, and the levers I and I' will be made without the stirrups i, and in the form shown in Fig. 10; or the stirrups may be dispensed with, the links J and J' serving ordinarily to provide for all necessary relative play of the parts. The levers K and K' are composed each of a horizontal arm extending to the pivotal or fulcrum point and a curved pendent arm, said last-named arms being each made in semi-annular form, with their concave sides or edges inward for facing each other, as shown in Fig. 12. The horizontal arms are cut away on their adjacent faces in such manner as to bring the pendent curved arms into the same vertical plane, and, thus formed, the two levers K and K' are connected with a common pivot, L, arranged directly over one of the truck-axles B', and parallel therewith in brackets b, attached to one or more of the transverse truck-frame timbers (see Fig. 11) in such manner that the pendent curved arms k and k' of said levers together form a ring surrounding the axle B'. The free ends of the curved arms, like the upper horizontal arms of the levers K and K', are cut away on their adjacent faces to adapt them to overlap one another, and at the same time keep the main portions of the two curved arms in the same vertical plane above referred to, and, except for certain relieving points or notches at $m$ and $m'$—one directly under the pivot or fulcrum and the other in the overlapping free ends—are each formed in the arc of a circle of which the axle B' is the center. (See Figs. 5 and 12.)

Upon the axle B' is secured a sleeve or collar, N, made by preference in two semi-cylindrical parts, as shown in Fig. 6, and provided with perforated lugs or ears $n$ and $n'$, through which they are bolted together, clamping the axle B' firmly between them, as by this arrangement they are adapted to axles of different diameters, and also to be readily applied to cars now in use. Other constructions of these sleeves may, however, be employed, if desired. The sleeve N is united to the axle near one of the wheels B², and is provided near the center of its length with ears $n^2$, arranged in pairs, and provided with bearings for the transverse pivots $o$ of a series of compound or jointed and rotating gravity-levers, P, for operating the levers K and K'. Four of these levers are preferred, for reasons which will be explained, though less or more may be used. Their construction is shown in detail views, Figs. 8 and 9, and in the side elevation, Fig. 7. They consist each of three parts—viz., the tongue or lever portion $p$, projecting within the circle formed by the semi-annular arms $k$ and $k'$ of the levers K and K', the weighted heel portion $p'$, extending on the opposite side of pivot $o$ to arm $p$, and a dog, $p^2$, pivoted to the inner end of the weight $p'$ and underlying the adjacent end of the arm $p$, the parts $p$ and $p'$ being made in the form of a narrow but heavy knuckle-jointed or butt hinge, with interlapping ears, through which both are connected through a common pivot, $o$, with the ears $n^2$. Shoulders $q$ and $q'$ are formed on the adjacent ends of the parts $p$ and $p'$ on the outer side of the pivots $o$, which abut against each other when the weight $p'$ is thrown outward by centrifugal action or by the dropping of said weight on the under side of the axle when said axle is rotating slowly or is at rest, causing the lighter arm to be forced inward, as indicated at P', Fig. 7. Immediately below the ear which connects the weight $p'$ with the pivot $o$ is a second ear, $r$, which enters a forked ear on the adjacent end of the dog $p^2$, and is connected therewith by a pin, $o'$, pivoting the dog to the inner end of said weight on the inner side of pivot $o$, thereby giving the dog $p^2$ a pivotal connection with the weight $p'$, eccentric to and on the inner side of the pivot $o$. The arm $p$ is provided on its inner face, adjacent to the shaft or axle, with a spur or lip, $s$, pendent when the arm is on the upper side of the shaft; and the outer or free end of the dog $p^2$ is made wedge shape and underlies the lip $s$, and just inside of the wedge-shaped end is a slight depression, $s'$, with which the lip $s$ engages when the weight $p'$ drops inward upon the shaft B' or sleeve N, serving, after it is engaged by the semi-annular arm of lever K, to prevent the lifting or outward throw of the weight and locking the arm $p$ in the horizontal position shown at P, Fig. 7. The outer ends of the arms $p$ are pivotal in form, and carry each a friction-roller, $p^3$, which, when said arms are raised or thrown outward from the axle into the position above indicated at P, rests in contact with the inner face of and crowds outward the arm $k$ or $k'$ of lever K or K', according to the direction of rotation of the axle B'. It will be apparent that this action last described can take place only when the axle is moving slowly enough to allow the weight $p'$ to drop inward upon the axle, and thus to thrust the dog $p^2$ under the lip $s$ of the arm $p$, allowing said lip to engage the notch $s'$ in said dog. It will also be apparent that when the axle is at rest or moving slowly, and the arm $p$ has reached the relieving-point on the under side of said axle, the weight $p'$ will fall away from said axle, and will withdraw the dog $p^2$, and consequently the latter can only be crowded inward to engage the lip $s$ when the lever P is on the upper side of the axle, and the gravity of the weight $p'$ causes the latter to fall inward toward the axle. The relieving-point or notch $m$ in the arms $k$ and $k'$ is provided to adapt the arm $p$, when the axle is at rest or moving slowly, to lift at this point just enough to enable the dog $p^2$ to pass under the lip $s$ and allow the latter to enter the notch $s'$ of said dog. The arm passes said notch or relieving-point $m$ while the weight $p'$ is still on the upper side of the axle and held down by gravity, and said arm, being held locked and prevented from falling in toward the axle by said dog, acts upon the arm $k$ or $k'$ according to the direction of rotation of the axle B, crowding said arm outward away from the axle, and, acting through the link J or J' on the short arm of the lever I or I', draws it downward, lifting the long arms of said levers I and I' and the pin I², connected therewith, thereby freeing the cam-lever F and the dog D, adapting the latter to move aside without actuating the brake-lever. The pressure or resistance of the arm $k$ or $k'$ forces the lip or spur $s$ of the arm $p$ snugly into the notch $s'$ of the dog or latch $p^2$, effectually preventing the release of said arm until the friction-roller $p^3$ on its end reaches and drops into the relieving-point or depression $m'$ in the arms $k$ and $k'$, thereby relieving the pressure on the arm $p$ and releasing the dog $p^2$, when the weight $p'$, being permitted to fall, said weight swings outward by its own gravity and withdraws the dog $p^2$, leaving the arm $p$ free to be acted upon by the weight, and to swing in toward the axle, as shown at P, Fig. 7. Small flat springs $u$ are secured to the sleeve N directly under the dogs $p^2$, of just sufficient tension to assist in raising the dog $p^2$ into engagement with the lip $s$ of arm $p$, and in holding it until the pressure comes on the said arm $p$, locking it in its raised position, as explained.

It will be understood that when the axles are rotating at high speed the weighted portion $p'$ of the levers P will always be thrown out from the axle, and will thus prevent the arms $p$ from coming in contact with the arms $k$ and $k'$, or in any way interfering with the gravity-stop $I^2$, and the velocity at which the arms $p$ will be thrown out to act on the arms $k$ and $k'$ will be determined by the relative preponderance of weight of the arm $p'$ over the arm $p$, and also by the length of the relieving-point or depression $m$ in the arms $k$ and $k'$. The longer said depression the greater the length of time which the weight $p'$ has to drop inward upon the axle. The rate of speed at which the pin $I^2$ will be lifted for relieving the cam-lever and freeing the dog D can thus be regulated at will.

The levers P and their relieving-points may be so proportioned (for example) as to act to release the cam-lever whenever the speed of the car or train is reduced to a rate of two miles an hour, (it may be made more or less, as desired,) at which speed the train is under the control of the engineer without the aid of the brakes. Above such speed, if the car is being drawn, the gravity-stop $I^2$ will drop on the outer side of the arm $F'$ of the cam-lever, locking said lever in position for holding the dog D, set to act on the brake-lever E, while with a pushing-engine the draw-bar will be pushed in, causing the dog to act on the cam-lever and to crowd the arm $F'$ to the outer side of the pin $I^2$; and when a speed of two miles an hour, or the regulated speed, whatever that may be, is attained the pin falls inside the arm $F'$ and locks the cam-lever out of position for acting on the dog until the speed is again reduced to that at which the jointed levers P can act on the arms $k$ and $k'$ and release the cam-lever, as explained. Thus the brake mechanism is not only made to automatically set the brakes to be acted upon by the compression of the draw-bar when the car is being drawn forward, but the same inward thrust or compression of the draw-bar when the car is being moved by pushing on the draw-bar is made to automatically throw the brake-setting mechanism out of action.

By the arrangement described it will be seen that after a car has been moving at speed and is being "slowed up" by the application of the brakes, as soon as the movement is reduced to the regulated speed the gravity-pin $I^2$ will be withdrawn, no matter how great the pressure exerted on the draw-bar in slowing up, thereby automatically, and while the car is yet moving, releasing or relieving the brake mechanism and adapting the movement of the car to be instantly reversed without the necessity of first taking up slack or drawing out the draw-bar to relieve the brakes.

Pendent flat springs W, attached to the truck-frame, serve to force the brake-bars away from the wheels, for holding the brakes out of contact with said wheels, when the brake mechanism described is not in action. They also serve to give sufficient resistance to the movement of the brake-lever to cause it to force the dog D, and also the cam-lever, to one side to permit the dog to pass by the brake-lever without actuating it when the cam-lever is not locked or held by the gravity pin or stop.

By the employment of four of the latch-levers P, as above described, they will divide the circle into quadrants, being separated by ninety degrees, and consequently there will always be one of said latch-levers in position to act upon the lever-arms $k$ or $k'$ in whichever direction the car is moving, and this is important in order to insure the free backing of a train or car by pushing on the draw-bar; otherwise, in starting to back, the pin $I^2$ might drop and lock the cam-lever with the dog in position for braking. Three latches or more than four may be used; but four are preferred, as insuring the object stated without unnecessary multiplication of said parts.

It is designed in practice to provide both trucks of the car with the mechanism described, and the brakes of said trucks may be connected in any usual way, whereby when the brakes of one truck are actuated the brakes of the other truck will also be actuated, though they may be left disconnected, if desired, as in either case the movement of the train in either direction serves to automatically set or relieve them, as explained.

In the above description of my improvements the simpler form of construction of the various parts has been given as the preferred one; but in practice it may be found desirable to modify the forms of said parts and to apply friction-rollers at various points for relieving friction and giving ease and freedom of movement. Thus friction-rollers may be applied to the opposite sides of the long arm of the cam-lever where it would rest in contact with the pin or gravity-stop $I^2$ for enabling the latter to be more easily lifted; to the hooked end of said arm, above and below the guiding-quadrant; to the ways in which pin $I^2$ moves, and to various other points which it is unnecessary to name, for the same purpose.

I am aware that governors have been employed in the form of pivoted blocks or arms thrown out by centrifugal force for setting brake mechanisms; but it will be observed that the "jointed levers P," so called, are simply thrown out of action by centrifugal force or action, and the setting of the brake mechanism is effected by a gravity-stop, the jointed levers acting on said gravity-stop only when the centrifugal force is so reduced by the slacking of the speed of the axle as to allow the weighted arm $p'$ to drop inward upon the axle, and by its gravity to set and lock the arm $p$, actuating the gravity-stop, and relieving the brake mechanism. These levers might, perhaps, properly be designated "gravity" latches or levers, as they are set and locked in operative position by gravity, being merely thrown out of action by centrifugal force.

Having now described my invention, I claim as new—

1. The combination, with the sliding draw-bar, of the brake-lever, the dog or block adjustable on said draw-bar for actuating the brake-lever, a cam-lever for adjusting said dog or block, and a gravity-stop for automatically locking said cam-lever, substantially as described.

2. The combination, with the sliding draw-bar, of the brake-lever, the dog or block adjustable on the draw-bar for actuating or relieving said brake-lever, a cam-lever for adjusting or relieving said dog or block, a gravity-stop for locking said cam-lever, and mechanism, substantially as described, for automatically lifting said gravity-stop and releasing the cam-lever.

3. The combination of the movable draw-bar, the adjustable dog or block connected therewith, the brake-lever projecting within the path of said dog or block, a cam-lever for adjusting said dog or block, and mechanism, substantially as described, for automatically locking and releasing said cam-lever, controlled by the speed of movement of the car, substantially as described.

4. A cam-lever for setting and relieving the brake-actuating mechanism, in combination with an automatically-actuated latch for locking and releasing said cam-lever, substantially as described.

5. The cam-lever for adjusting the dog on the draw-bar, and setting it to act upon or to relieve the brake-lever, in combination with a gravity-stop for locking said cam-lever, a jointed and weighted lever on the axle, and mechanism interposed between said stop and jointed lever for adapting the latter to act upon said stop and release the cam-lever, substantially as described.

6. The combination, with the brake-actuating mechanism, of a gravity-stop for setting said mechanism, levers connected with said stop for raising it and releasing the brake mechanism, levers having pendent semi-annular arms surrounding the axle, and jointed and weighted levers on the axle for actuating said semi-annularly-armed levers, arranged and operating substantially as described.

7. The combination, with the gravity-stop I², of the levers I and I', semi-annularly-armed levers K and K', and jointed levers on the axle for actuating said semi-annularly-armed levers and raising and releasing the gravity-stop, substantially as described.

8. The levers K and K', having curved pendent arms, in combination with jointed levers on the axle, disconnected from said levers K and K' for actuating the latter and automatically setting and releasing the brake-actuating mechanism, substantially as described.

9. The combination, with the semi-annularly-armed levers K and K', and intermediate lever or levers, connecting said levers with the gravity-stop I², of jointed levers on the axle for actuating said levers K and K', substantially as described.

10. Jointed levers on the axle, in combination with levers having curved or semi-annular arms provided with relieving-points or depressions on the adjacent concave sides for setting and releasing said jointed levers, substantially as described.

11. In a mechanism for setting and releasing the brake-actuating mechanism, jointed levers on the axle, consisting of a lever-arm, a weighted arm, and a pivoted latch or dog actuated by the weighted arm for setting and releasing the lever-arm, substantially as and for the purpose described.

12. The jointed levers on the axle, provided with lever-arms having friction-rollers for actuating the levers, and latch or stop for releasing the brake-actuating mechanism, and with sliding dogs for locking and releasing said lever-arms, substantially as described.

13. The combination, with the car-axle, of the jointed levers P, composed of the lever-arm $p$, weight $p'$, and dog $p^2$, and the spring $u$, applied and operating substantially as and for the purpose described.

14. The combination, with the cam-lever for setting and relieving the brake mechanism, of the gravity pin or stop I² for locking the cam-lever, and the levers I and I' for lifting said stop, arranged and operating substantially as described.

15. The combination, with the pivoted dog on the draw-bar for actuating the brake-lever, of the cam-lever F for adjusting or relieving said dog, made in angular or bell-crank form, with its long arm F' extended inward longitudinally of the car, substantially as described.

16. The cam-lever F, made in the bell-crank or angular form described, in combination with the transversely-arranged guiding-quadrant $h$, substantially as and for the purpose specified.

17. The cam-lever F for adjusting or relieving the dog, actuating the brake mechanism, made in angular or bell-crank form, in combination with the chain F'' for adjusting said lever, substantially as described.

18. The combination, with the levers I and I', and the angular levers K and K' for raising the gravity-stop I², of the links J and J', provided with adjustable loops or eyes, substantially as described.

In testimony whereof I have hereunto set my hand this 29th day of December, A. D. 1882.

CHARLES V. ROTE.

Witnesses:
GEO. A. LANE,
G. W. KENNEDY.